(12) United States Patent
Baumgartner et al.

(10) Patent No.: US 8,970,346 B2
(45) Date of Patent: Mar. 3, 2015

(54) SIGNAL SENSITIVITY CONTROL DURING PASSIVE AUTHENTICATION

(75) Inventors: Josef Baumgartner, Voels (AT); Gerald L. Ostrander, Davison, MI (US); Brian J. Marlett, Macomb, MI (US); Patricia Abi-Nader Kachouh, Sterling Heights, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1751 days.

(21) Appl. No.: 11/435,250

(22) Filed: May 16, 2006

(65) Prior Publication Data

US 2006/0261925 A1   Nov. 23, 2006

Related U.S. Application Data

(60) Provisional application No. 60/686,069, filed on May 27, 2005, provisional application No. 60/683,540, filed on May 20, 2005.

(51) Int. Cl.
| | |
|---|---|
| *G05B 19/00* | (2006.01) |
| *B60R 25/04* | (2013.01) |
| *B60R 25/24* | (2013.01) |
| *G07C 9/00* | (2006.01) |

(52) U.S. Cl.
CPC .............. *B60R 25/04* (2013.01); *B60R 25/24* (2013.01); *G07C 9/00309* (2013.01); *G07C 2009/00793* (2013.01); *G07C 2209/63* (2013.01)
USPC ........................................... 340/5.72

(58) Field of Classification Search
USPC ............... 340/5.72, 5.64, 5.61, 3.1; 307/10.1
See application file for complete search history.

(56) References Cited

U.S. PATENT DOCUMENTS

| | | | | |
|---|---|---|---|---|
| 4,403,208 | A | * | 9/1983 | Hodgson et al. .............. 340/902 |
| 4,853,972 | A | * | 8/1989 | Ueda et al. ....................... 455/83 |
| 5,420,568 | A | * | 5/1995 | Iida et al. ....................... 340/542 |
| 5,517,189 | A | * | 5/1996 | Bachhuber et al. .......... 340/5.64 |
| 5,602,535 | A | | 2/1997 | Boyles et al. |
| 6,028,505 | A | * | 2/2000 | Drori ........................ 340/426.17 |
| 6,038,460 | A | * | 3/2000 | Aleiner ......................... 455/571 |
| 6,140,938 | A | * | 10/2000 | Flick ........................ 340/825.69 |
| 6,396,412 | B1 | * | 5/2002 | Banas ............................ 340/5.2 |
| 6,556,125 | B1 | * | 4/2003 | Rohrl ............................ 340/5.62 |
| 6,657,536 | B1 | | 12/2003 | Avenel |

(Continued)

FOREIGN PATENT DOCUMENTS

| | | | |
|---|---|---|---|
| EP | 1 058 214 A1 | 12/2000 | |
| EP | 1 428 694 A2 | 6/2004 | |
| EP | 1 466 789 A1 | 10/2004 | |
| GB | 2027900 | * 2/1980 | ............... G01V 3/11 |
| GB | 2 396 730 A | 6/2004 | |

OTHER PUBLICATIONS

PCT International Search Report for International Application No. PCT/US2006/019396 mailed Oct. 20, 2006.

(Continued)

*Primary Examiner* — Vernal Brown

(57) ABSTRACT

A method of controlling the signal sensitivity of a receiver module of a remote signal communication system includes initializing a PASE function and actuating a switch from a first position to a second position. The second position represents an open switch wherein either an external antenna or a LNA circuit or both are shut off. The switch is returned to a first position in response to completion of a PASE command.

4 Claims, 2 Drawing Sheets

(56) References Cited

U.S. PATENT DOCUMENTS

| | | | |
|---|---|---|---|
| 6,690,259 B2 * | 2/2004 | Aslanidis et al. | 340/5.61 |
| 6,825,752 B2 * | 11/2004 | Nahata et al. | 340/5.64 |
| 6,831,611 B2 * | 12/2004 | Ooe et al. | 343/713 |
| 7,046,119 B2 * | 5/2006 | Ghabra et al. | 340/5.72 |

OTHER PUBLICATIONS

PCT Written Opinion of the International Searching Authority for International Application No. PCT/US2006/019396 mailed Oct. 20, 2006.

* cited by examiner

SIGNAL SENSITIVITY CONTROL DURING PASSIVE AUTHENTICATION

CROSS REFERENCE TO RELATED APPLICATIONS

This application claims priority to U.S. Provisional Application No. 60/686,069 filed May 27, 2005 and U.S. Provisional Application No. 60/683,540, filed May 20, 2005.

BACKGROUND OF THE INVENTION

This invention generally relates to remote signal communication systems, and more particularly to a method of controlling the signal sensitivity of a remote signal communication system during passive authentication.

A variety of remote signal communication systems are used in vehicles. Radio frequency (RF) signals have become a communication mode of choice in a number of systems of this type. Examples include remote keyless entry systems (RKE) and passive entry and starting systems (PASE). Such systems typically include a handheld transmitter, such as a key fob or "smart card", which provides a signal to a receiver module located on the vehicle. The receiver module actuates a vehicle system in response to transmissions received from the transmitter. The receiver module may unlock a vehicle door in response to transmissions received from the transmitter where the system controlled by the transmitter is a RKE system, for example. In another example, the doors of a vehicle are automatically unlocked where the transmitter is within a predefined range, such as approximately three meters, from the vehicle and the system controlled by the transmitter is a PASE system.

One challenge facing designers of typical RKE systems is increasing the range in which the transmitter and the receiver module components of the RKE system will satisfactorily operate. Typically, the receiver module is provided with an external antenna, such as an antenna encased in the rear view window of a vehicle, to increase the distance that the receiver module may effectively respond to transmissions emitted by the transmitter. In addition, a low noise amplifier (LNA) circuit is typically provided within the receiver module to amplify the incoming signal received by the receiver module where the operating range of the RKE system is required to be large.

Disadvantageously, use of external antennas and LNA circuits to increase the operating range of an RKE system may result in a non-functioning PASE system. For example, the external antenna receives an increased signal which includes increased noise associated with that signal. In addition, the LNA circuit amplifies the signal including the noise associated with the signal. The combination of the receipt of an increased signal by the external antenna and the amplification of the increased signal by the LNA circuit may cause interference with the RF frequency carrier signal that the PASE system is operating on that is so extreme that the PASE system is rendered non-functioning. This results in the necessity of the vehicle owner to enter and start the vehicle in a traditional manner such as by using a key. In the alternative, the external antenna may be unplugged so as to not interfere with the PASE system. However, by unplugging the external antenna, the RKE system performance may be severely diminished.

Accordingly, it is desirable to provide both external antenna and LNA circuit control during passive authentication such that both an RKE system and a PASE system may be utilized simultaneously without decreased performance by either system.

SUMMARY OF THE INVENTION

An example method of controlling the signal sensitivity of a receiver module comprises initializing a PASE function and actuating a switch from a first position to a second position in response to the detected PASE function. In one example, an external antenna is temporarily shut off where the switch is positioned in the second position. In another example, an LNA circuit is temporarily shut off when the switch is in a second position. The switch is returned to the first position in response to completion of a PASE command. In one example, the PASE command comprises starting the vehicle.

An example method of performing passive authentication includes triggering a vehicle PASE function, decreasing the signal sensitivity of a receiver module, communicating signals to a transmitter from the receiver module, and authorizing entry into a vehicle. In one example, decreasing the signal sensitivity of the receiver module comprises temporarily shutting off an external antenna. In another example, decreasing the signal sensitivity of the receiver module comprises temporarily shutting off an LNA circuit. The signal sensitivity of the receiver module is returned to a maximum level in response to completion of the passive authentication.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
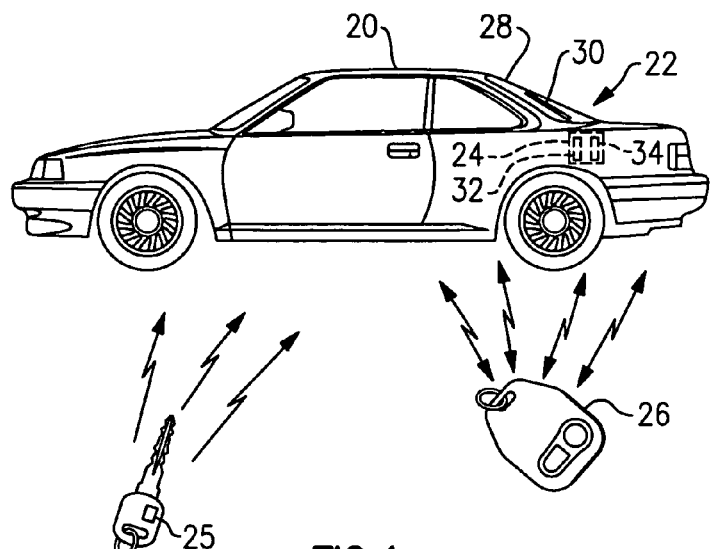
FIG. 1 is a schematic representation of a vehicle equipped with a remote signal communication system.

Referring to FIG. 1, a vehicle 20 is equipped with multiple remote signal communication systems 22. The present invention is described in terms of a vehicle 20 that includes both a passive entry and starting system (PASE) and a remote keyless entry system (RKE). Although the present invention is described in terms of a PASE system and an RKE system, it should be understood that the vehicle 20 may be equipped with any combination and number of remote signal communication systems 22.

The vehicle 20 includes a receiver module 24. The receiver module 24 communicates with transmitters 25, 26 of the PASE system and the RKE system. The PASE system transmitter is preferably a smart key 25. The transmitter of the RKE system is preferably a key fob 26. In one example, the receiver module 24 is a radio frequency (RF) receiver such that the transmitters 25, 26 of the PASE system and the RKE system communicate with the receiver module 24 by communicating RF signals. Although the remote signal communication systems 22 are described herein in terms of RF signals, it should be understood that other communication mediums may be utilized according to the present invention.

In one example the receiver module 24 is mounted near the rear packing shelf of the vehicle 20, or between the rear seat and the rear windshield 28 of the vehicle 20. In another example, two receiver modules 24 are mounted near the rear packing shelf of the vehicle. The actual number of receiver modules 24 utilized on the vehicle and the location of each receiver module 24 will vary depending upon application specific parameters such as the vehicle model and the number of remote signal communication systems 22 the vehicle is equipped with.

The vehicle 20 is also equipped with at least one signal enhancement device. In one example, an external antenna 30 is connected to the receiver module 24 by a connector assembly. The external antenna 30 is one type of signal enhancement device which provides a range of operation for which the receiver module 24 will receive RF signals from the transmitters 25, 26 of the PASE system and the RKE system. For example, a range of at least 60 meters may be achieved with the use of an external antenna 30. In one example, the external antenna 30 is substantially contained within the rear windshield. The external antenna 30 may be mounted to the vehicle in any known manner.

The receiver module 24 also includes a low noise amplifier (LNA) circuit 32 as a second signal enhancement device. The LNA circuit 32 of the receiver module 24 amplifies the incoming signal received from the transmitter of either a PASE system or an RKE system to improve the operating range of the respective system. The receiver module 24 also includes a controller 34. The controller 34 may be of any suitable microcontroller, microprocessor, computer or the like. The controller 34 includes instructions for performing both RKE and PASE system functions. A worker of ordinary skill in the art with the benefit of the teachings herein would be able to program the controller 34 with the appropriate instructions for controlling the signal sensitivity of the receiver module 24, as is further discussed below.

In response to the RF data received from the transmitter 25, 26, the receiver module 24 actuates a vehicle system. In one example, the receiver module 24 unlocks a vehicle door with a system controlled by the transmitter and is an RKE system. In another example, the receiver module 24 automatically starts the engine of the vehicle where the system controlled by the transmitter 25 is a PASE system. It should be understood that any electronic vehicle system may be actuated by the receiver module 24 according to the present invention.

Figure 2A:
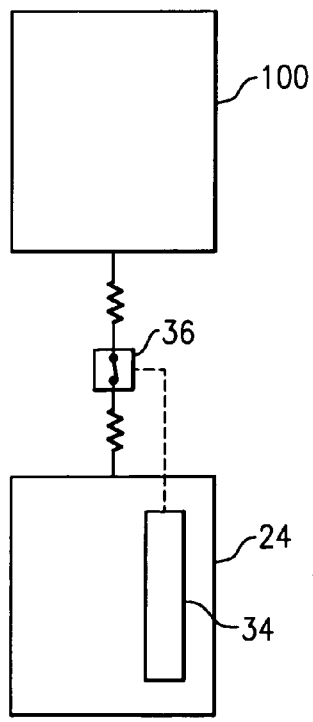
FIGS. 2A and 2B schematically illustrate an example receiver module having a switch for controlling the signal sensitivity of a remote signal communication system according to the present invention.

Referring to FIG. 2A, the receiver module 24 includes a simple switch 36 for controlling the signal sensitivity of remote signal communication systems 22. In this example, the switch 36 is in a first position. In the first position, the switch 36 is closed such that current is able to flow to a signal enhancement device 100 (i.e. either or both of the external antenna 30 and the LNA circuit 32). Therefore, where the switch is in the first position, a maximum signal sensitivity is achieved by the receiver module 24.

Figure 2B:
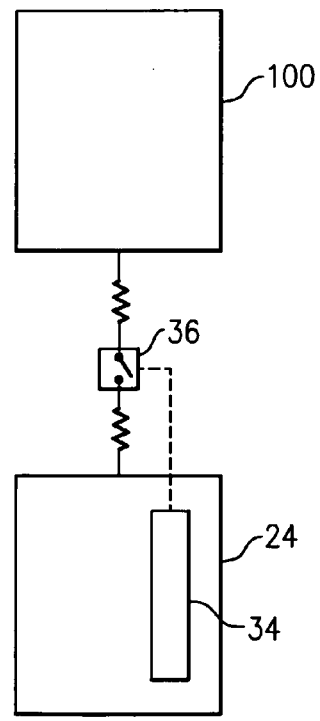

Referring to FIG. 2B, the switch 36 is in a second position. In one example, the second position of the switch 36 is an open position such that current is unable to flow to the signal enhancement device 100. The controller 34 controls actuation of the switch 36 between the first and second positions. A minimum signal sensitivity is achieved by the receiver module 24 where the switch 36 is in the open position. The amount of interference affecting the PASE system is greatly reduced where the switch 36 is actuated to the second position. Although the signal sensitivity control of the present invention is shown and described herein in terms of a switch 36, it should be understood that other known control methods may be utilized to perform the signal sensitivity control.

Figure 3:
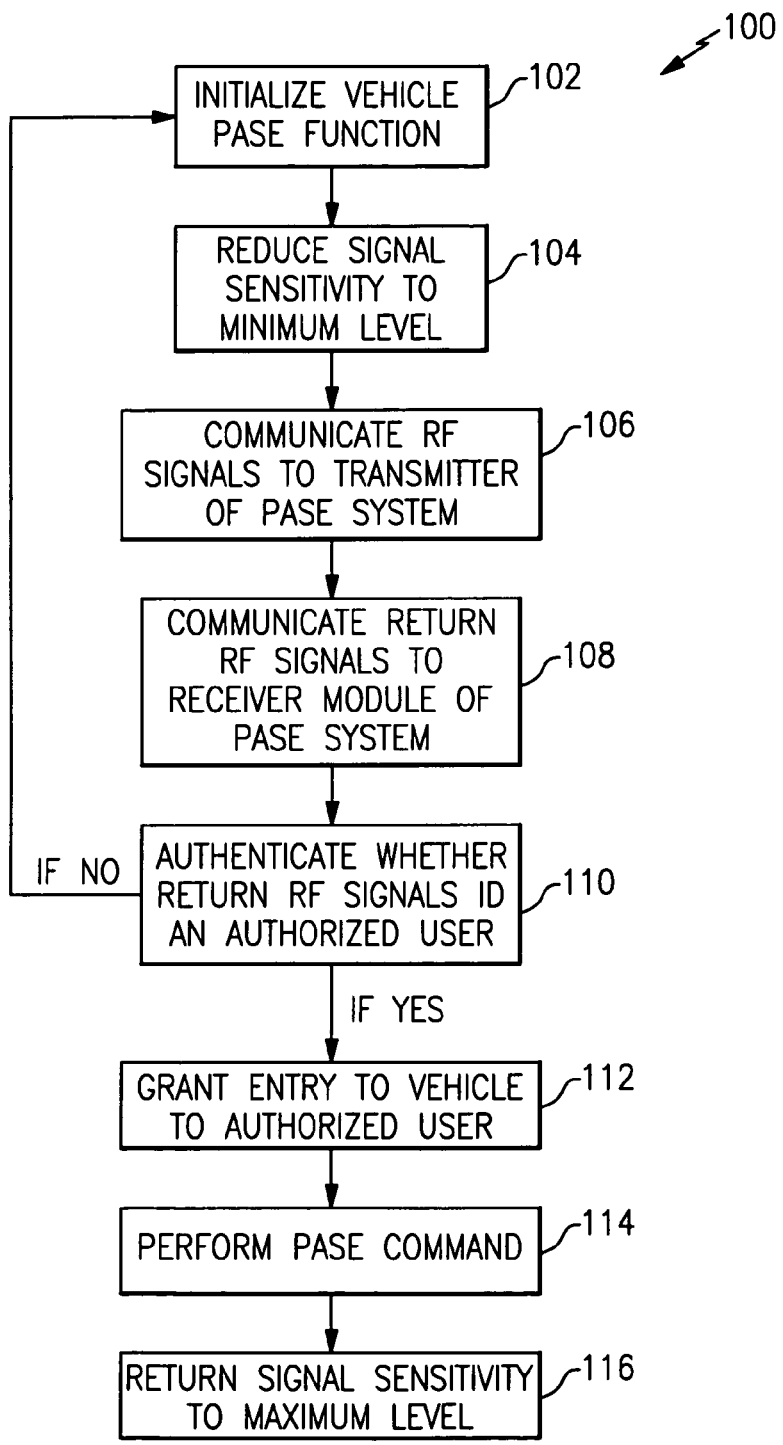
FIG. 3 is a block diagram illustrating an example method of controlling the signal sensitivity of a receiver module according to the present invention.

Referring to FIG. 3, and with continuing reference to FIGS. 1, 2A and 2B, a method 100 for controlling the signal sensitivity of the receiver module 24 is illustrated. The method 100 begins at step block 102 where a vehicle PASE function is initialized. In one example, the vehicle PASE function is initialized by touching a door handle of a vehicle 20. It should be understood that the receiver module 24 may be programmed to trigger the vehicle PASE function in any other known manner.

Next, at step block 104, the signal sensitivity of the receiver module 24 is reduced to a minimum level. The signal sensitivity of the receiver module 24 represents the ability of the receiver module 24 to effectively respond to transmissions emitted by the transmitters 25, 26 of a PASE system or a RKE system. Where the signal sensitivity of the receiver module 24 is decreased to the minimum level, the RKE system is unable to properly function. Therefore, the amount of interference affecting the PASE system is significantly reduced.

In one example, the signal sensitivity of the receiver module 24 is decreased to a minimum level by temporarily shutting off the external antenna 30. In another example, the signal sensitivity is reduced to the minimum level by temporarily shutting off the LNA circuit 32. The receiver module 24 decreases the signal sensitivity by actuating the switch 36 on its circuit board from a first position to a second position. The first position represents a fully functioning external antenna 30 or LNA circuit 32. Where the switch is in the second position, the external antenna 30 and the LNA circuit 32 are shut off. In another example, actuating the switch to the second position temporarily shuts off both the external antenna 30 and the LNA circuit 32.

Once the signal sensitivity of the receiver module 24 is decreased to the minimum level, the receiver module 24 communicates RF signals to the transmitter 25 of the PASE system at step block 106. The PASE system is able to properly function in any environment due to the lack of interference resulting from the decreased signal sensitivity. Next, at step block 108, the transmitter of the PASE system communicates return RF signals to the receiver module 24. The receiver module 24 authenticates whether the return RF signals identify an authorized user at step block 110. A worker of ordinary skill in the art would be able to implement the appropriate instructions into the receiver module 24 to perform a passive authentication of this type. If an authorized user is identified by the receiver module 24, the user is granted entry into the vehicle 20 at step block 112. That is, the receiver module 24 communicates a signal to unlock the vehicle doors. If an authorized user is not identified at step block 110, the method returns to step block 102 and the entire passive authentication process is repeated.

Next, at step block 114, a PASE command is performed by the PASE system. In one example, the PASE command comprises starting the vehicle. The receiver module 24 is programmed to start the vehicle 20 in response to locating the PASE system transmitter 25 within a passenger cabin of the vehicle. The start of the vehicle 20 represents the completion of the passive authentication of the PASE system.

In response to completion of the passive authentication by the PASE system, the receiver module 24 automatically increases its signal sensitivity to a maximum level at step block 116. The signal sensitivity of the receiver module 24 is increased to the maximum level by actuating a switch from the second position back to the first position. The external antenna 30 and the LNA circuit 32 function in a normal manner where the switch of the receiver module 24 is in the first position. Therefore, the functionality of the RKE system is restored at step block 116.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

We claim:

1. A remote signal communication system, comprising:
a transmitter;
a signal enhancement device; and
a receiver module in communication with said transmitter, wherein said receiver module includes a switch for controlling the functionality of said signal enhancement device, wherein the signal enhancement device is switched off to decrease signal sensitivity responsive to receiving a signal initializing a passive entry and starting system.

2. The system as recited in claim 1, wherein said switch includes a first position and a second position, said signal enhancement device being shut off in response to said switch being in said second position.

3. The system as recited in claim 1, wherein said signal enhancement device comprises an external antenna.

4. The system as recited in claim 1, wherein said signal enhancement device comprises a low noise amplifier circuit.

* * * * *